(12) United States Patent
Wang

(10) Patent No.: US 9,578,324 B1
(45) Date of Patent: Feb. 21, 2017

(54) VIDEO CODING USING STATISTICAL-BASED SPATIALLY DIFFERENTIATED PARTITIONING

(71) Applicant: Google Inc., Mountain View, CA (US)

(72) Inventor: Yunqing Wang, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 391 days.

(21) Appl. No.: 14/317,749

(22) Filed: Jun. 27, 2014

(51) Int. Cl.
*H04N 7/50* (2006.01)
*H04N 19/176* (2014.01)
*H04N 19/136* (2014.01)

(52) U.S. Cl.
CPC .. *H04N 19/00278* (2013.01); *H04N 19/00139* (2013.01)

(58) Field of Classification Search
CPC ... H04N 7/50; H04N 7/26244; H04N 7/26271
See application file for complete search history.

(56) References Cited

U.S. PATENT DOCUMENTS

| | | | |
|---|---|---|---|
| 3,825,832 A | 7/1974 | Frei et al. |
| 4,463,372 A | 7/1984 | Bennett et al. |
| 4,710,810 A | 12/1987 | Koga |
| 4,719,642 A | 1/1988 | Lucas |
| 4,729,127 A | 3/1988 | Chan et al. |
| 4,736,446 A | 4/1988 | Reynolds et al. |
| 4,816,906 A | 3/1989 | Kummerfeldt et al. |
| 4,868,764 A | 9/1989 | Richards |
| 4,891,748 A | 1/1990 | Mann |
| 5,068,724 A | 11/1991 | Krause et al. |
| 5,083,214 A | 1/1992 | Knowles |
| 5,122,873 A | 6/1992 | Golin |
| 5,136,371 A | 8/1992 | Savatier et al. |
| 5,136,376 A | 8/1992 | Yagasaki et al. |
| 5,148,269 A | 9/1992 | de Haan et al. |

(Continued)

FOREIGN PATENT DOCUMENTS

| | | |
|---|---|---|
| EP | 1351510 | 10/2003 |
| GB | 2350515 | 11/2000 |

(Continued)

OTHER PUBLICATIONS

Bronshtein I N, et al., "Handbook of Mathematics—Passage", 2004; pp. 194-195.

(Continued)

*Primary Examiner* — Dave Czekaj
*Assistant Examiner* — Nam Pham
(74) *Attorney, Agent, or Firm* — Young Basile Hanlon & MacFarlane, P.C.

(57) ABSTRACT

Frames of a video data stream can be encoded using statistically-based spatially differentiated partitioning. Statistically-based spatially differentiated partitioning involves forming a difference frame between a current video frame and a temporally nearby video frame and then calculating the variance of the difference frame on a block-by-block basis. A histogram can be formed from the calculated variances and a threshold determined on the histogram. The determined threshold can be used to select parameters for the encoding process that will more efficiently encode static or slow-motion areas without a significant loss in resulting quality.

20 Claims, 12 Drawing Sheets

(56) References Cited

U.S. PATENT DOCUMENTS

| | | | |
|---|---|---|---|
| 5,164,819 A | 11/1992 | Music |
| 5,231,484 A | 7/1993 | Gonzales et al. |
| 5,270,812 A | 12/1993 | Richards |
| 5,274,442 A | 12/1993 | Murakami et al. |
| 5,295,201 A | 3/1994 | Yokohama |
| 5,313,306 A | 5/1994 | Kuban et al. |
| 5,337,086 A | 8/1994 | Fujinami |
| 5,351,086 A | 9/1994 | Park |
| 5,374,958 A | 12/1994 | Yanagihara |
| 5,398,068 A | 3/1995 | Liu et al. |
| 5,432,870 A | 7/1995 | Schwartz |
| 5,452,104 A | 9/1995 | Lee |
| 5,463,701 A | 10/1995 | Kantner, Jr. et al. |
| 5,512,952 A | 4/1996 | Iwamura |
| 5,561,475 A | 10/1996 | Jung |
| 5,561,477 A | 10/1996 | Polit |
| 5,576,767 A | 11/1996 | Lee et al. |
| 5,589,945 A | 12/1996 | Abecassis |
| 5,596,370 A | 1/1997 | Jung |
| 5,659,539 A | 8/1997 | Porter et al. |
| 5,666,461 A | 9/1997 | Igarashi et al. |
| 5,696,869 A | 12/1997 | Abecassis |
| 5,734,744 A | 3/1998 | Wittenstein et al. |
| 5,748,247 A | 5/1998 | Hu |
| 5,768,533 A | 6/1998 | Ran |
| 5,774,593 A | 6/1998 | Zick et al. |
| 5,777,680 A | 7/1998 | Kim |
| 5,793,647 A | 8/1998 | Hageniers et al. |
| 5,818,969 A | 10/1998 | Astle |
| 5,828,370 A | 10/1998 | Moeller et al. |
| 5,886,742 A | 3/1999 | Hibi et al. |
| 5,903,264 A | 5/1999 | Moeller et al. |
| 5,929,940 A | 7/1999 | Jeannin |
| 5,930,379 A | 7/1999 | Rehg et al. |
| 5,930,493 A | 7/1999 | Ottesen et al. |
| 5,963,203 A | 10/1999 | Goldberg et al. |
| 5,991,447 A | 11/1999 | Eifrig et al. |
| 5,999,641 A | 12/1999 | Miller et al. |
| 5,999,655 A | 12/1999 | Kalker et al. |
| 6,005,980 A | 12/1999 | Eifrig et al. |
| 6,011,872 A | 1/2000 | Qian et al. |
| 6,014,706 A | 1/2000 | Cannon et al. |
| 6,026,183 A | 2/2000 | Talluri et al. |
| 6,035,059 A | 3/2000 | Kurosawa et al. |
| 6,035,060 A | 3/2000 | Chen et al. |
| 6,035,067 A | 3/2000 | Ponticos |
| 6,041,145 A | 3/2000 | Hayashi et al. |
| 6,055,330 A | 4/2000 | Eleftheriadis et al. |
| 6,061,397 A | 5/2000 | Ogura |
| 6,075,875 A | 6/2000 | Gu |
| 6,084,908 A | 7/2000 | Chiang et al. |
| 6,108,383 A | 8/2000 | Miller et al. |
| 6,112,234 A | 8/2000 | Leiper |
| 6,119,154 A | 9/2000 | Weaver et al. |
| 6,141,381 A | 10/2000 | Sugiyama |
| 6,167,164 A | 12/2000 | Lee |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,212,234 B1 | 4/2001 | Andoh et al. |
| 6,222,174 B1 | 4/2001 | Tullis et al. |
| 6,233,017 B1 | 5/2001 | Chaddha |
| 6,240,135 B1 | 5/2001 | Kim |
| 6,249,613 B1 | 6/2001 | Crinon et al. |
| 6,249,614 B1 | 6/2001 | Kolesnik et al. |
| 6,256,423 B1 | 7/2001 | Krishnamurthy et al. |
| 6,271,890 B1 | 8/2001 | Tamir et al. |
| 6,272,179 B1 | 8/2001 | Kadono |
| 6,275,614 B1 | 8/2001 | Krishnamurthy et al. |
| 6,289,049 B1 | 9/2001 | Kim et al. |
| 6,292,837 B1 | 9/2001 | Miller et al. |
| 6,327,304 B1 | 12/2001 | Miller et al. |
| 6,337,917 B1 | 1/2002 | Onural et al. |
| 6,359,929 B1 | 3/2002 | Boon |
| 6,370,267 B1 | 4/2002 | Miller et al. |
| 6,377,709 B1 | 4/2002 | Guillotel |
| 6,381,277 B1 | 4/2002 | Chun et al. |
| 6,400,763 B1 | 6/2002 | Wee |
| 6,427,028 B1 | 7/2002 | Donescu et al. |
| 6,501,860 B1 | 12/2002 | Charrier et al. |
| 6,526,097 B1 | 2/2003 | Sethuraman et al. |
| 6,529,634 B1 | 3/2003 | Thyagarajan et al. |
| 6,529,638 B1 | 3/2003 | Westerman |
| 6,570,924 B1 | 5/2003 | Lynch et al. |
| 6,661,925 B1 | 12/2003 | Pianykh et al. |
| 6,687,303 B1 | 2/2004 | Ishihara |
| 6,697,061 B1 | 2/2004 | Wee et al. |
| 6,707,952 B1 | 3/2004 | Tan et al. |
| 6,711,211 B1 | 3/2004 | Lainema |
| 6,754,266 B2 | 6/2004 | Bahl et al. |
| 6,757,434 B2 | 6/2004 | Miled et al. |
| 6,765,964 B1 | 7/2004 | Conklin |
| 6,909,749 B2 | 6/2005 | Yang et al. |
| 6,985,526 B2 | 1/2006 | Bottreau et al. |
| 6,987,866 B2 | 1/2006 | Hu |
| 6,996,283 B2 | 2/2006 | Thyagarajan |
| 7,010,032 B1 | 3/2006 | Kikuchi et al. |
| 7,027,506 B2 | 4/2006 | Lee et al. |
| 7,027,654 B1 | 4/2006 | Ameres et al. |
| 7,076,113 B2 | 7/2006 | Le Dinh |
| 7,085,319 B2 | 8/2006 | Prakash et al. |
| 7,136,534 B2 | 11/2006 | Thyagarajan et al. |
| 7,143,352 B2 | 11/2006 | Divakaran et al. |
| 7,170,937 B2 | 1/2007 | Zhou |
| 7,227,977 B1 | 6/2007 | Dotsenko |
| 7,236,524 B2 | 6/2007 | Sun et al. |
| 7,263,125 B2 | 8/2007 | Lainema |
| 7,280,597 B2 | 10/2007 | Zhang et al. |
| 7,330,509 B2 | 2/2008 | Lu et al. |
| 7,499,492 B1 | 3/2009 | Ameres et al. |
| 7,599,435 B2 | 10/2009 | Marpe et al. |
| 8,116,374 B2 | 2/2012 | Gordon et al. |
| 8,155,454 B2 | 4/2012 | Raveendran |
| 8,170,102 B2 | 5/2012 | Bhaskaran et al. |
| 8,233,676 B2 | 7/2012 | Ngan et al. |
| 8,243,797 B2 | 8/2012 | Lin et al. |
| 8,532,189 B2 * | 9/2013 | Kervec .......... G06T 7/2053 348/700 |
| 8,594,189 B1 | 11/2013 | Bankoski et al. |
| 8,781,004 B1 | 7/2014 | Bankoski et al. |
| 8,891,627 B1 | 11/2014 | Bankoski et al. |
| 2001/0041015 A1 | 11/2001 | Chui |
| 2002/0012471 A1 | 1/2002 | Nayyar |
| 2002/0031272 A1 | 3/2002 | Bagni et al. |
| 2002/0039441 A1 | 4/2002 | Klassen |
| 2002/0080871 A1 | 6/2002 | Fallon et al. |
| 2002/0136448 A1 | 9/2002 | Bortolussi et al. |
| 2002/0145616 A1 | 10/2002 | Doan |
| 2002/0168108 A1 | 11/2002 | Loui et al. |
| 2003/0020260 A1 | 1/2003 | Maxisch |
| 2003/0039307 A1 | 2/2003 | Prakash et al. |
| 2003/0053685 A1 | 3/2003 | Lestideau |
| 2003/0095598 A1 | 5/2003 | Lee et al. |
| 2003/0123545 A1 | 7/2003 | Prakash et al. |
| 2003/0152149 A1 | 8/2003 | Denolf |
| 2003/0161399 A1 | 8/2003 | Ali |
| 2003/0202594 A1 | 10/2003 | Lainema |
| 2004/0120398 A1 | 6/2004 | Zhang et al. |
| 2004/0120400 A1 | 6/2004 | Linzer |
| 2004/0131117 A1 | 7/2004 | Sheraizin et al. |
| 2004/0156549 A1 | 8/2004 | Persiantsev |
| 2004/0179820 A1 | 9/2004 | Kashiwagi et al. |
| 2004/0208392 A1 | 10/2004 | Raveendran et al. |
| 2004/0228410 A1 | 11/2004 | Ameres et al. |
| 2004/0240555 A1 | 12/2004 | De With et al. |
| 2004/0240556 A1 | 12/2004 | Winger et al. |
| 2004/0252886 A1 | 12/2004 | Pan et al. |
| 2005/0013494 A1 | 1/2005 | Srinivasan et al. |
| 2005/0111744 A1 | 5/2005 | Kupeev et al. |
| 2005/0147165 A1 | 7/2005 | Yoo et al. |
| 2005/0152456 A1 | 7/2005 | Orchard et al. |
| 2005/0169374 A1 | 8/2005 | Marpe et al. |
| 2005/0180506 A1 | 8/2005 | Wittebrood et al. |
| 2005/0232351 A1 | 10/2005 | Jung |

(56) References Cited

U.S. PATENT DOCUMENTS

| | | |
|---|---|---|
| 2005/0265447 A1 | 12/2005 | Park |
| 2005/0276497 A1 | 12/2005 | Chen et al. |
| 2006/0078049 A1 | 4/2006 | Bao et al. |
| 2006/0098737 A1 | 5/2006 | Sethuraman et al. |
| 2006/0114995 A1 | 6/2006 | Robey et al. |
| 2006/0114996 A1 | 6/2006 | Thoreau et al. |
| 2006/0126739 A1 | 6/2006 | Stoner |
| 2006/0155398 A1 | 7/2006 | Hoffberg et al. |
| 2006/0165163 A1 | 7/2006 | Burazerovic et al. |
| 2006/0215758 A1 | 9/2006 | Kawashima |
| 2006/0239345 A1 | 10/2006 | Taubman et al. |
| 2006/0257048 A1 | 11/2006 | Lin et al. |
| 2007/0025444 A1 | 2/2007 | Okada et al. |
| 2007/0064801 A1 | 3/2007 | Wang et al. |
| 2007/0076947 A1 | 4/2007 | Wang et al. |
| 2007/0115156 A1 | 5/2007 | Lim et al. |
| 2007/0140342 A1 | 6/2007 | Karczewicz et al. |
| 2007/0140346 A1 | 6/2007 | Chen et al. |
| 2007/0165958 A1 | 7/2007 | Picard |
| 2007/0171974 A1 | 7/2007 | Baik |
| 2007/0236513 A1 | 10/2007 | Hedenstroem et al. |
| 2008/0008398 A1 | 1/2008 | Tanaka et al. |
| 2008/0056347 A1 | 3/2008 | Chiu et al. |
| 2008/0063069 A1 | 3/2008 | Sekiguchi et al. |
| 2008/0151997 A1 | 6/2008 | Oguz |
| 2008/0152245 A1 | 6/2008 | El-Maleh et al. |
| 2008/0159408 A1 | 7/2008 | Degtyarenko |
| 2008/0175475 A1 | 7/2008 | Sung |
| 2008/0199091 A1 | 8/2008 | Srinivasan et al. |
| 2008/0212678 A1 | 9/2008 | Booth et al. |
| 2008/0246884 A1 | 10/2008 | Chung |
| 2008/0260241 A1 | 10/2008 | Ye et al. |
| 2009/0034619 A1 | 2/2009 | Mukherjee et al. |
| 2009/0097543 A1 | 4/2009 | Pan et al. |
| 2009/0103617 A1 | 4/2009 | Au et al. |
| 2009/0161938 A1 | 6/2009 | Shekhar et al. |
| 2009/0226044 A1 | 9/2009 | Ngan et al. |
| 2009/0262835 A1 | 10/2009 | Srinivasan et al. |
| 2009/0263000 A1 | 10/2009 | Shinagawa et al. |
| 2009/0278961 A1 | 11/2009 | Mohanty et al. |
| 2009/0296814 A1 | 12/2009 | Lin et al. |
| 2009/0304255 A1 | 12/2009 | Hagiwara et al. |
| 2009/0322937 A1 | 12/2009 | Young et al. |
| 2009/0324121 A1 | 12/2009 | Bhagavathy et al. |
| 2010/0020879 A1 | 1/2010 | Pasquier et al. |
| 2010/0054344 A1 | 3/2010 | Puri et al. |
| 2010/0061444 A1 | 3/2010 | Wilkins et al. |
| 2010/0208799 A1 | 8/2010 | Park et al. |
| 2010/0208812 A1 | 8/2010 | Murakami et al. |
| 2010/0208827 A1 | 8/2010 | Divorra Escoda et al. |
| 2010/0246939 A1 | 9/2010 | Aisaka et al. |
| 2010/0246951 A1 | 9/2010 | Chen et al. |
| 2010/0272173 A1 | 10/2010 | Puri et al. |
| 2010/0278271 A1 | 11/2010 | MacInnis |
| 2010/0303150 A1 | 12/2010 | Hsiung et al. |
| 2010/0328538 A1 | 12/2010 | Al-Kadi et al. |
| 2011/0007977 A1 | 1/2011 | Amonou et al. |
| 2011/0019927 A1 | 1/2011 | Nagamatsu |
| 2011/0122950 A1 | 5/2011 | Ji et al. |
| 2011/0182352 A1 | 7/2011 | Pace |
| 2011/0182509 A1 | 7/2011 | Free |
| 2011/0188579 A1 | 8/2011 | Lin et al. |
| 2011/0249756 A1 | 10/2011 | Doepke |
| 2011/0274176 A1 | 11/2011 | Panusopone et al. |
| 2011/0317903 A1 | 12/2011 | Hasslmeyer et al. |
| 2012/0020407 A1 | 1/2012 | Liu et al. |
| 2012/0027083 A1 | 2/2012 | Narroschke et al. |
| 2012/0082238 A1 | 4/2012 | Panusopone et al. |
| 2012/0106650 A1 | 5/2012 | Siegman et al. |
| 2012/0155532 A1 | 6/2012 | Puri et al. |
| 2012/0230418 A1 | 9/2012 | Sole Rojals et al. |
| 2013/0039417 A1 | 2/2013 | Wang et al. |
| 2013/0101019 A1 | 4/2013 | Wilkins et al. |
| 2013/0148729 A1 | 6/2013 | Sasai et al. |
| 2013/0195177 A1 | 8/2013 | Hong et al. |
| 2013/0208784 A1 | 8/2013 | Pietila |
| 2013/0251279 A1 | 9/2013 | Park et al. |
| 2013/0266080 A1 | 10/2013 | Lu et al. |

FOREIGN PATENT DOCUMENTS

| | | |
|---|---|---|
| GB | 2371434 | 7/2002 |
| JP | 2007036888 | 2/2007 |
| KR | 20060035542 | 4/2006 |
| WO | WO0207164 | 1/2002 |
| WO | WO03041405 | 5/2003 |
| WO | WO03045069 A2 | 5/2003 |
| WO | WO2006078115 | 7/2006 |
| WO | WO2008002491 | 1/2008 |
| WO | WO2008016605 | 2/2008 |
| WO | WO2009086761 | 7/2009 |
| WO | WO2011087295 | 7/2011 |

OTHER PUBLICATIONS

Carreira, Joao et al. "Constrained Parametric Min-Cuts for Automatic Object Segmentation", 2010 IEEE Conference on Computer Vision and Pattern Recognition (CVPR), San Francisco, CA, Jun. 13-18, 2010.

Chen et al. (Predictive Video Decoding Based on Ordinal Depth of Moing Regions, IEEE Proceedings of ICC 2010).

Flexible Macroblock Ordering; Wikipedia; Jul. 15, 2008.

Giovani Gomez, et al. Automatic feature constructions and a simple rule induction algorithm for skin detection, itesm capus cuernavaca, paseo de la reforma 182 A, Temixo, Morelos 62589, Mexico, 8 pages. 2002.

Guo, Liwei, Peng Yin, and Edouard Francois, "TE3: Simplified Geometry Block Partitioning", Joint Collaborative Team on Video (JTC-VC) of ITU-T SG16 WP3 and ISO/IEC JTC1/SC29?WG11, @nd Meeting : Geneva, CH Jul. 21-28, 2010.

ISO/IEC: "information Technology—Coding of audio-visual objects" Retrieved from the internet: Http://kazus.ru/nuke/modules/downloads/pub/144/0/ISO-IEC-14496-2-2001.

ISR & Written Opinion , RE: Application # PCT/US2011/035720; Aug. 19, 2011.

ISR & Written Opinion, RE: Application # PCT/US2012/050042; Oct. 30, 2012.

ISR and Written opinion of the International Searching Authoriy for International Application No. PCT/US13/24782, dated Apr. 16, 2013, 19 pages.

Jure Kovac, et al., Human Skin Colour Clustering for Face Detection, University of Ljubljana, Slovenia, 5 pages.

Karczewicz, Marta, Peisong Chen, Rajan Joshi, Xianglin Wang, and Wei-Jung Chien, "Video coding technology proposal by Qualcomm Inc.", Joint Collaborative Team on Video Coding (JTC-VC) of ITU-T SG16 WP3 and ISO/IEC JTC1/SC29/WG11, 1st Meeting: Dresden, DE Apr. 15-23, 2010.

Kondo S, et al.,"A Motion Compensation Technique Using Sliced Blocks in Hybrid Video Coding", Proceedings of the 2005 International Conference on Image Processing , vol. 2, Sep. 11, 2005; pp. 305-308.

Lee et al, Bit Allocation for MPEG-4 Video Coding with Spatio-Temporal Tradeoffs, Jun. 2003, pp. 488-502, [retrieved from Internet on Jul. 19, 2011] <URL:http://ieeexplore.ieee.org/stamp/stamp.jsp?tp=&arnumber=1207406>.

Liu et al., "Evaluations and Suggestions about TU Representation", No. JCTVC-E883, Mar. 9, 2011.

M. Bierling, Displacement estimation by hierarchical blockmatching. 1998, in Proceedings of SPIE Visual Communications and Image Processing 88, p. 942-951.

Marcos Nieto, Luis Salgado, Narciso Garcia; Fast Mode Decision Based on Activity Segmentation in H.264/AVC Encoding; Grupo de Tratamiento de Imagenes—E.T.S. Ingenieros de Telecomunicacion, Universidad Politecnica de Madrid, Spain; Springer-Verlag Berlin Heidelberg 2006.

McCann et al., "HEVC Test Model 3 (HM 3) Encoder Description," No. JCTVC-E682, Mar. 29, 2011.

(56) References Cited

OTHER PUBLICATIONS

Moschetti et al, Automatic Object Extraction and Dynamic Bitrate Allocation for Second Generation Video Coding, Multimedia and Expo, 2002. ICME '02 Proceedings. 2002 IEEE International Conference on Lausanne, Switzerland, Aug. 26, 2002, pp. 493-496, vol. 1,Piscataway, New Jersey, USA.
Nunes P et al, Rate Control for Scenes with Multiple Arbitrarily Shaped Video Objects, ITG Fachberichte, Jan. 1, 1997, pp. 303-308, Berlin, Germany.
Panusopone et al., "JCT-VC AHG report: Coding block Structures," No. JCTVC-E887, Mar. 14, 2011.
Panusopone et al., "RQT with rectangular transform unit support," Document JCTVC-F578-r3, 6th Meeting; Torino, Italy, Jul. 14-22, 2011.
Panusopone, et al., "Efficient Transform Unit Representation," 4. JCT-VC Meeting;95 MPEG Meeting; Jan. 20-Jan. 28, 2011; Daegu; (Joint Collaborative Team on Video Coding of ISO/IEC JTC1/SC29/WG11 and ITU-T SG16); Jan. 15, 2011.
Panusopone, et al., "Evaluation of RQT in HM and related TU representation" JCT-VC Meeting; Mpeg Meeting; Mar. 23, 2011; Geneva.
Pascal Fleury et al: "MPEG-4 video verification model: A solution for interactive multimedia applications" Journal of Electronic Imaging, SPIE/IS&T Engineering Information Inc.; vol. 7, Jul. 1, 1998, pp. 502-515.
Paul et al. ("Video coding focusing on block partitioning and occlusion," IEEE Transactions on Image Processing, vol. 19, No. 3, Mar. 2010, 691-701)—discloses pattern-based coding that divides a frame using different block shapes and sizes.
Sun Y et al, Asynchronous Rate Control for Multi-Object Videos, IEEE Transactions on Circuits and Systems for Video Technology, Aug. 1, 2005, pp. 1007-1018, vol. 15, No. 8 [retrieved from Internet on Jul. 19, 2011] <URL: http://ieeexplore. ieee.org/stamp/stamp.jsp?tp=&arnumber=1490554>.
Tan,et al., "RQT depth selection", MPEG Meeting; Geneva; (Motion Picture Expert Group); Mar. 20, 2011.
Tarek Mahmound, A new fast skin color detection technique, Worl Academy of Science, Engineering and Technology 43 2008, 5 pages.
Vladimir Vezhnevets, et al., A Survey on Pixel Based Skin Color Detection Techniques, Graphics and Media Laboratory, Moscow Russia, 8 pages, 2003.
Wiegand et al., "WD2: Working Draft 2 of High-Efficiency Video Coding," JCTVC-D503, Jan. 2011.
Wien et al., "H.26L Core Experiment Description for Adaptive Block Transforms," Video Coding Experts Group of ITU-T SG.16; Portland, Oregon; Aug. 2000.
Yu et al., "Adaptive Scan for Large Blocks for HEVC," Joint Collaborative Team on Video Coding, Torino, Jul. 2011.
Yuan, et al., "CE2: Non-Square Quadtree Transform for symmetricand asymmetric motion partitions," JCTVC-F410, 6th Meeting: Torino, IT, Jul. 14-22, 2011.
Congxia Dai; Escoda, O.D.; Peng Yin; Xin Li; Gomila, C., "Geometry-Adaptive Block Partitioning for Intra Prediction in Image & Video Coding," Image Processing, 2007. ICP 2007. IEEE International Conference on, vol. 6, No., pp. VI-85, VI-88, Sep. 16, 2007-Oct. 19, 2007.
Ferreira, R. U. et al., "Efficiency Improvements for a Geometric-Partition-Based Video Coder", Image Processing (ICIP), 2009 16th IEEE International Conference Nov. 2009.
Guo L, et al. "TE3: Simplified Geometry Block Partitioning", JCT-VC (Joint Collaborative Team on Video Coding) Meeting Jul. 21-Jul. 28, 2010.
ISR & Written Opinion, Re: Application # PCT/US2011/053761; Nov. 29, 2011.
Kim, M.,"Tool Experiment 9: Large Black Structure", Joint Collaborative Team on Video Coding (JCT-VCB309), Jul. 2010.

Krit Panusopone et al., "Flexible Picture Partitioning", JCT-VC (Joint Collaborative Team on Video Coding) JCTVC-C260, Meeting, Oct. 7-Oct. 15, 2010.
Krit Panusopone, et al. "Efficient Transform Unit Representation," Joint Collaborative Team on Video Coding (JCT-VC) of UTU-T SG16 WP3 and ISO/IEC JTC1/SC29/WG11 4nd Meeting: Daegu, KR, Jan. 22, 2011.
Papathanassiadis T., "Image Block Partitioning: A Compression Technique Suitable fo Parallel Processing", Image Processing and Its Applications, 1992. International Conference on Maastricht, Netherlands, London, UK. Jan. 1, 1992.
Sullivan, G. J. et al., "Recent developments in standardization of high efficiency video coding (HEVC)", Society of Photo-Optical Instrumentation Engineers 2010.
Yuan, et al., "Asymmetric motion partition with OBMC and Non-Square TU," Mar. 2011, JCTVE-E376 (version 4).
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, an Open Source Video Codec for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.

\* cited by examiner

VIDEO CODING USING STATISTICAL-BASED SPATIALLY DIFFERENTIATED PARTITIONING

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Real-time video streaming, multi-point video conferencing or video broadcasting are examples of applications that employ video stream encoding including compression. In addition to the resources required for storage and transmission of encoded video streams, the encoding itself can require substantial computing resources.

SUMMARY

This disclosure relates in general to encoding and decoding visual data, such as video stream data, for transmission or storage using statistically-based spatially differentiated partitioning. One method taught herein describes forming a difference frame using a first video frame and a second video frame of a video stream, calculating a variance for each block of the difference frame, forming a variance histogram using at least some of the calculated variances, determining a threshold variance value wherein a portion of the blocks of the variance histogram have variances less than or equal to the threshold, selecting at least one encoding parameter for a block of the first video frame based on a comparison of a variance of a spatially-correspondent block in the difference frame with the threshold variance value, and encoding the block of the first video frame using the at least one encoding parameter.

An apparatus described herein includes a memory and a processor. According to one implementation, the processor is configured to execute instructions stored in the memory to form a difference frame using a first video frame and a second video frame of a video stream, calculate a variance for each block of the difference frame, form a variance histogram using at least some of the calculated variances, determine a threshold variance value wherein a portion of the blocks of the variance histogram have variances less than or equal to the threshold, select at least one encoding parameter for a block of the first video frame based on a comparison of a variance of a spatially-correspondent block in the difference frame with the threshold variance value, and encode the block of the first video frame using the at least one encoding parameter.

Variations in these and other aspects of this disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
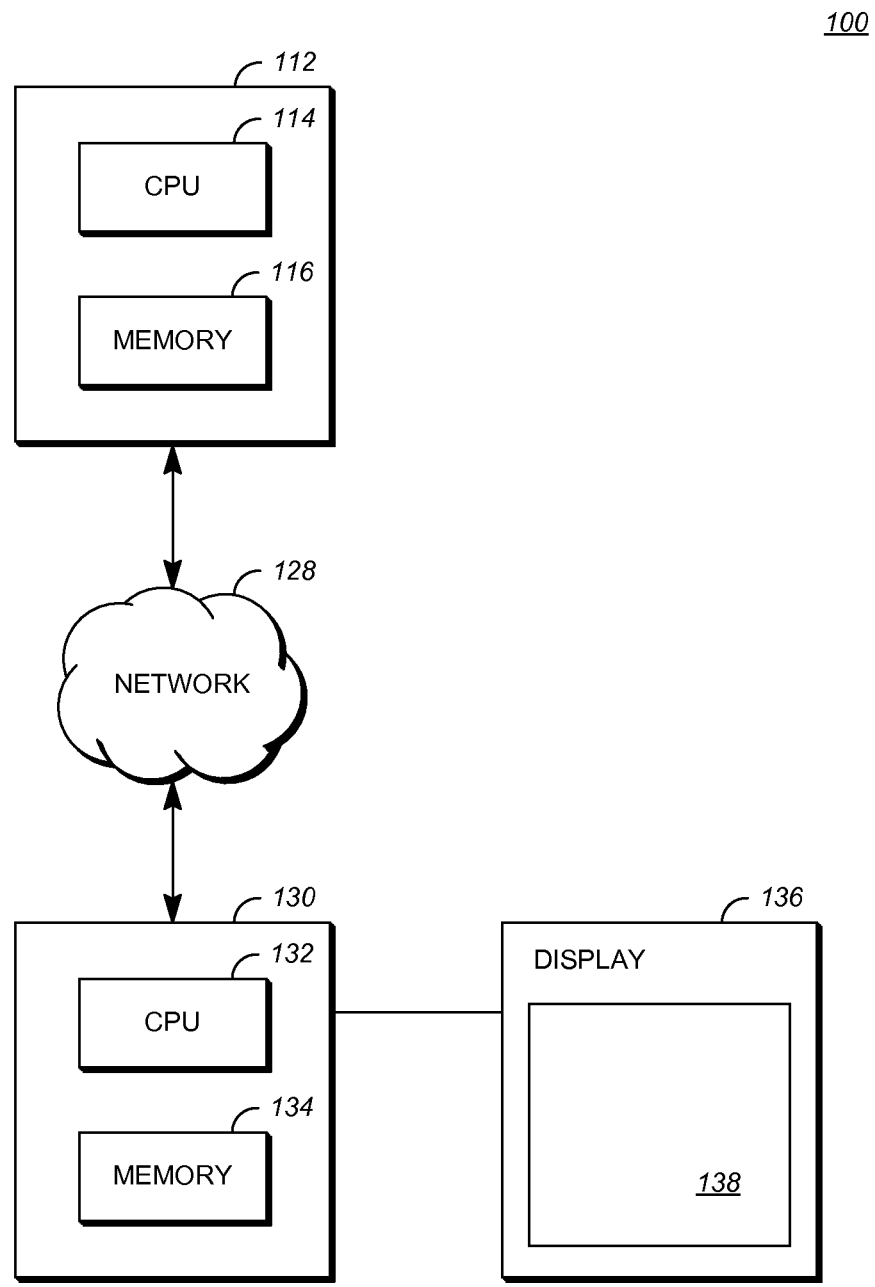
FIG. 1 is a schematic of a video encoding and decoding system.

A video stream may be compressed by a variety of techniques to reduce bandwidth required transmit or store the video stream. A video stream can be encoded into a bitstream, which can involve compression, and then transmitted to a decoder that can decode or decompress the video stream to prepare it for viewing or further processing. Encoding a video stream can involve parameters that make trade-offs between video quality and bitstream size, where increasing the perceived quality of a decoded video stream can increase the number of bits required to transmit or store the bitstream.

In video encoding, a substantial amount of computing resources can be required to compress the video stream. For example, a video frame can be divided into plural partitions that range from 4×4 to 64×64, encompassing all of the rectangular and square sub-blocks of the 64×64 block including 4×4, 4×8, 8×4, 8×8, 8×16, 16×8, 16×16, 16×32, 32×16, 32×32, 32×64, 64×32 and 64×64 pixels blocks. The optimal partitioning for a frame can be found by exhaustive search using combinations of these partitions. For example, the encoder can test all possible partitionings for a frame by performing test encoding for each block in the combinations as part of a rate/distortion loop. A rate/distortion loop measures the "rate" or bitstream size for a resulting "distortion" or video quality level for different encoding parameters based on the partitionings and compares the results. Generally, the encoding parameters and partitioning that scores the best in terms of bitstream size for a desired video quality can be selected to encode blocks of the video frame.

One of the ways in which an encoder compresses video data while maintaining video quality is to remove spatial and temporal redundancy in the video stream. Motion prediction can base encoding decisions on the motion of objects in the video frame. In some video streams, parts of a sequence of video frames may represent static or slow motion. This can be particularly true if the video stream represents video conferencing or screen sharing. If static or slowly moving portions of the video stream can be identified before encoding, the encoding process can be optimized to speed up the process while maintaining a desired video quality. For example, it is generally more desirable to use larger partitions in static or slow motion areas, while using smaller partitions for fast motion areas.

According to the teachings herein, statistical techniques may be applied that effectively differentiate the static or slow motion areas from fast motion areas. For encoding the current frame, a difference frame may be formed using the current frame and a temporally nearby video frame. The variances measured for the blocks of the difference frame can be used to form a cumulative histogram. The histogram can be used to separate static or slow motion areas from fast motion areas in the presence of video noise. Additional details are described below after a discussion of the environment in which implementations of the invention may be incorporated.

FIG. 1 is a schematic of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
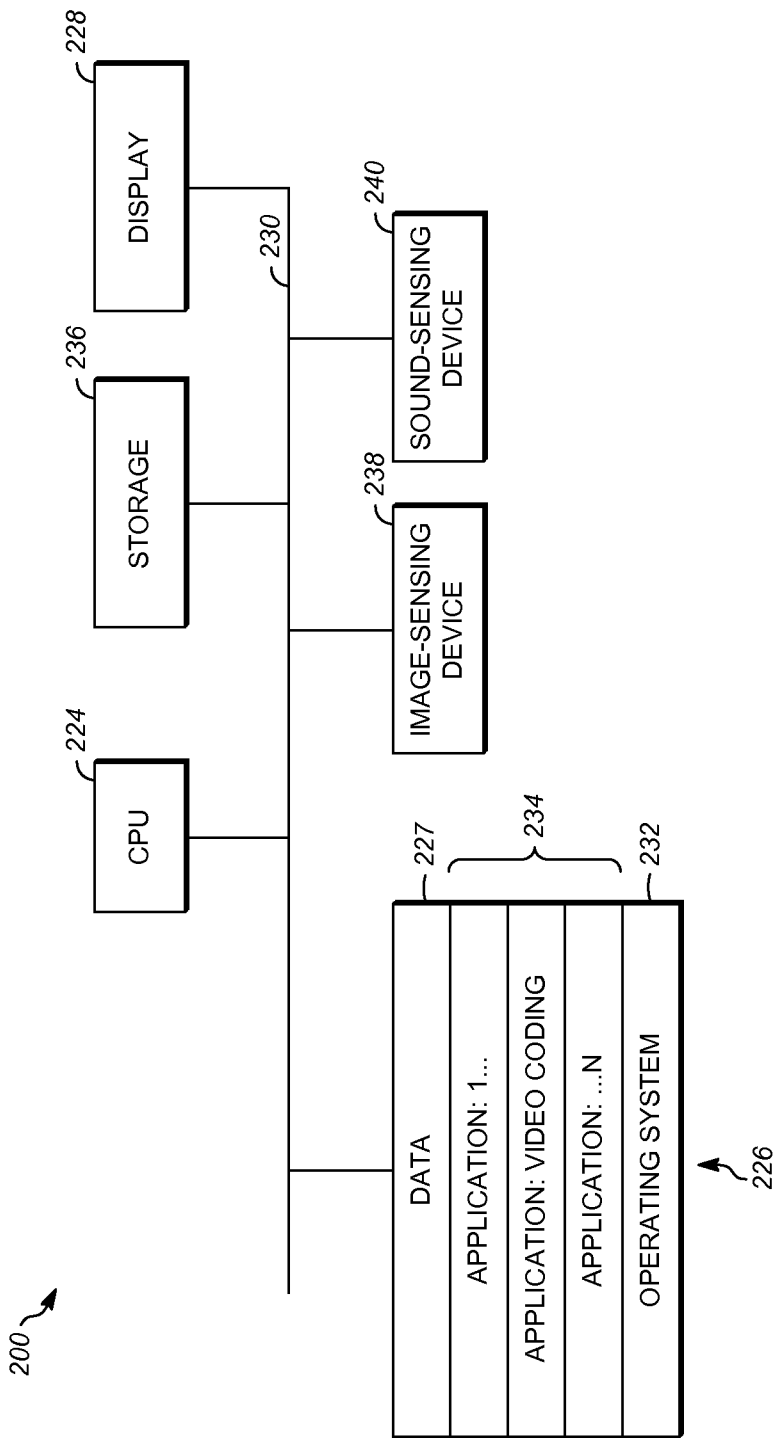
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

When used in a video conferencing system, for example, transmitting station 112 and/or receiving station 130 may include the ability to both encode and decode a video stream as described below. For example, receiving station 130 could be a video conference participant who receives an encoded video bitstream from a video conference server (e.g., transmitting station 112) to decode and view and further encodes and transmits its own video bitstream to the video conference server for decoding and viewing by other participants.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video coding application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
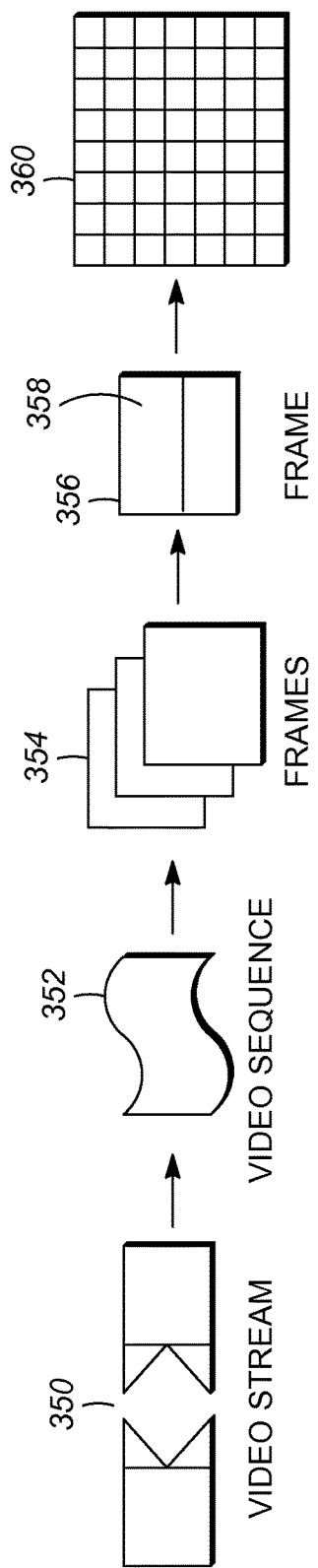
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames 354. Adjacent frames 354 can then be further subdivided into individual frames, e.g., a single frame 356. At the next level, a single frame 356 can be divided into a series of segments or planes 358. Segments (or planes) 358 can be subsets of frames that permit parallel processing, for example. Segments 358 can also be subsets of frames that can separate the video data into separate colors. For example, a frame 356 of color video data can include a luminance plane and two chrominance planes. Segments 358 may be sampled at different resolutions.

Whether or not frame 356 is divided into segments 358, frame 356 may be further subdivided into blocks 360, which can contain data corresponding to, for example, 16×16 pixels in frame 356. Blocks 360 can also be arranged to include data from one or more planes of pixel data. Blocks 360 can also be of any other suitable size such as 4×4 pixels, 8×8 pixels, 16×8 pixels, 8×16 pixels, 16×16 pixels or larger. Unless otherwise noted, the terms block and macroblock are used interchangeably herein.

Figure 4:
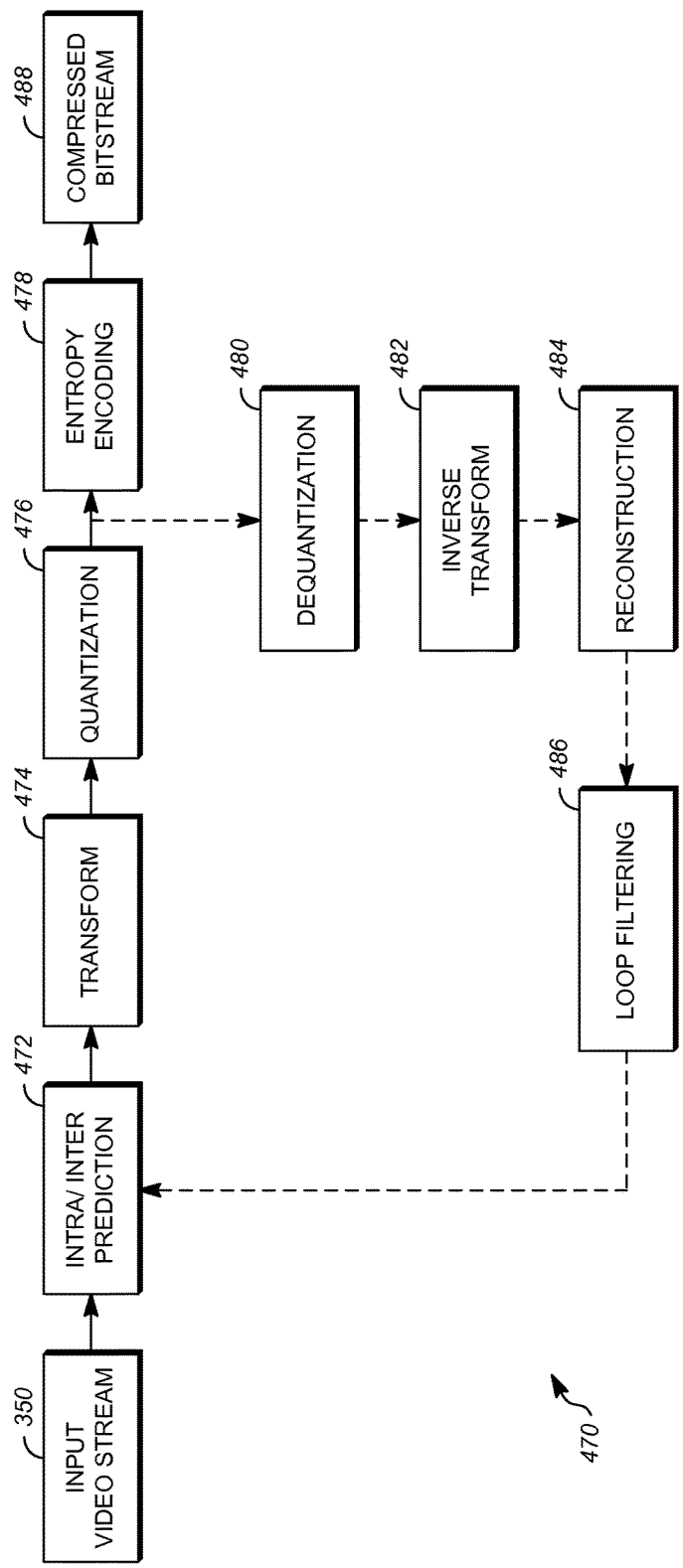
FIG. 4 is a block diagram of a video compression system in according to an aspect of the teachings herein.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. An input into one or more stages of encoder 470 may be the determination of whether a block is within a static or slow motion area as discussed in more detail below starting with FIG. 6. Encoder 470 may also include a reconstruction path (shown by the dotted connection lines) to reconstruct a frame for encoding of future blocks. In FIG. 4, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 can be processed in units of blocks. At intra/inter prediction stage 472, each block can be encoded using intra-frame prediction (also called intra prediction) or inter-frame prediction (also called inter prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames.

Next, referring again to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), the Singular Value Decomposition Transform (SVD) and the Asymmetric Discrete Sine Transform (ADST). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix. Note that the size of the prediction block may be different from the size of the transform block.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to compressed bitstream 488. Compressed bitstream 488 can be formatted using various techniques, such as variable length coding (VLC) or arithmetic coding. Compressed bitstream 488 can also be referred to as an encoded video stream or encoded video bitstream, and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474 for certain blocks or frames. In another implementation, an encoder 470 can have quantization stage 476 and dequantization stage 480 combined into a single stage.

Figure 5:
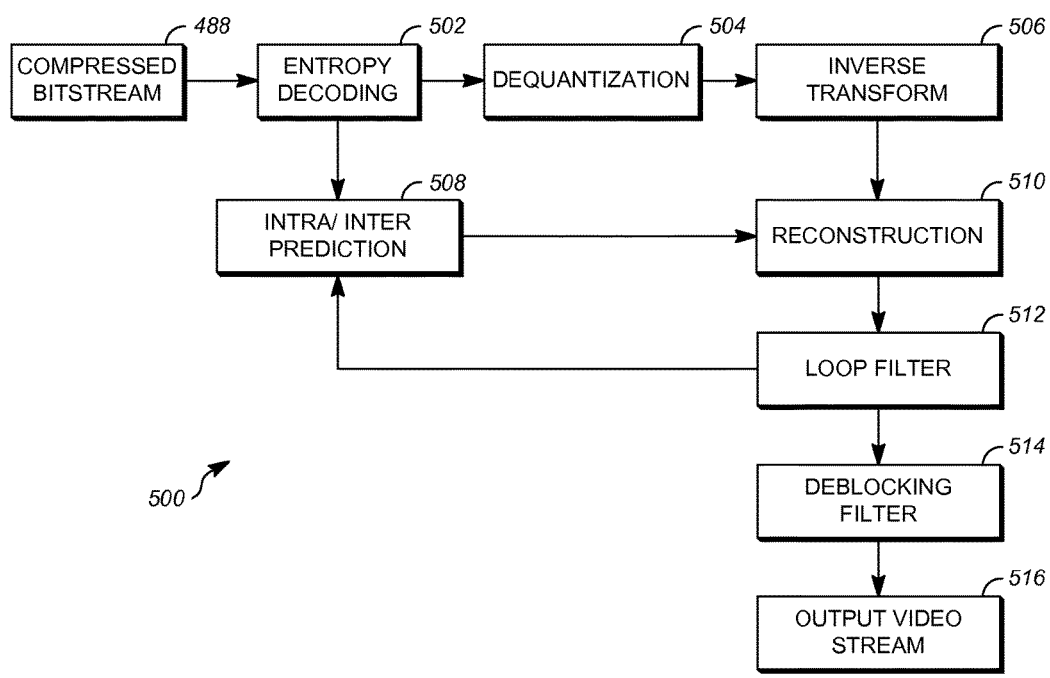
FIG. 5 is a block diagram of a video decompression system according to another aspect of the teachings herein.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. In this example, deblocking filtering stage 514 is applied to the reconstructed block to reduce blocking distortion, and the result is output as output video stream 516. Output video stream 516 can also be referred to as a decoded video stream, and the terms will be used interchangeably herein.

Other variations of decoder 500 can be used to decode compressed bitstream 488. For example, decoder 500 can produce output video stream 516 without deblocking filtering stage 514.

As mentioned briefly above, coding efficiency may be improved when it is known which portions of a frame include static or slow motion areas and which include fast motion areas. For example, if it is known that portions of a current frame include static or slow motion areas, testing for partitioning may be limited to larger partitions (i.e., larger blocks). As another example, the motion search range may be reduced for blocks within static or slow motion areas in the motion search of intra/inter prediction stage 472. Another encoding parameter that can be adjusted/selected based on the determination of whether a block is within a static or slow motion area or within a fast motion area is the quantizer used in quantization stage 476. The determination of static or slow motion areas and fast motion areas is described next.

Figure 6:
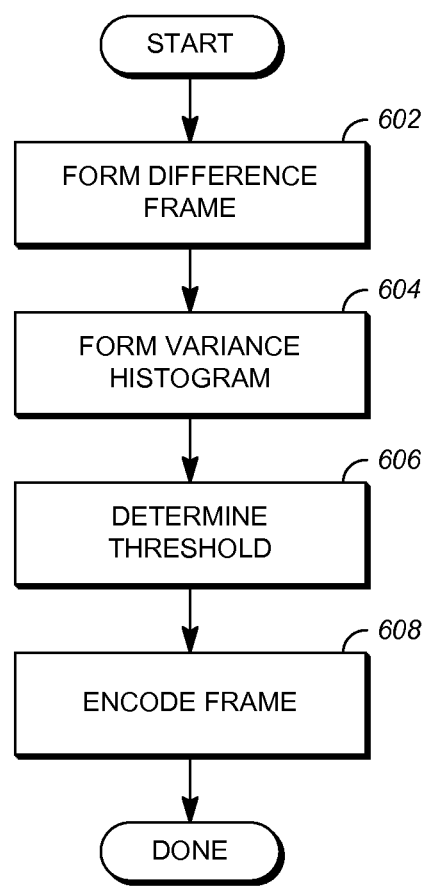
FIG. 6 is a flowchart diagram of a process for partitioning a video frame according to an aspect of the teachings herein.

FIG. 6 is a diagram of a process 600 for encoding a video stream using statistical-based spatially differentiated partitioning. Process 600 can be implemented in a system such as computing device 200 as part of the encoding process for a video stream. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter. Process 600 assumes that a previous unencoded frame of video data is available in addition to the current unencoded frame of video data. Process 600 may use unencoded versions of both the current frame and previous frame in order to obtain an accurate measure of the variance. Encoding a frame followed by decoding can create an approximation of the original input frame that may alter the data enough to cause the variance measure to become less indicative of the contents of the video frame than the original unencoded data. An unencoded frame may also be called a raw frame herein.

At step 602, a difference frame $S_d$ can be formed by subtracting a temporally nearby video frame S' from a current video frame S. The temporally nearby video frame S' can be a previous frame or a succeeding frame of the sequence of frames forming the video stream. In the case where a previous video frame is used to form the difference frame, the previous frame can be stored temporarily in a buffer until the current video frame is received. In the case where a succeeding video frame is used to form the difference frame, the current video frame can be stored in a buffer until the succeeding frame is received from the video stream. In either case the video frame used to form the difference frame with the current video frame can be selected so as to minimize the differences between the frames and thereby provide a difference frame $S_d$ where the variance of the difference frame reflects the contents of the current frame as opposed to differences caused by motion or other changes in the video stream. The subtraction may be performed on a pixel-by-pixels basis using luminance values, for example.

Figure 7:
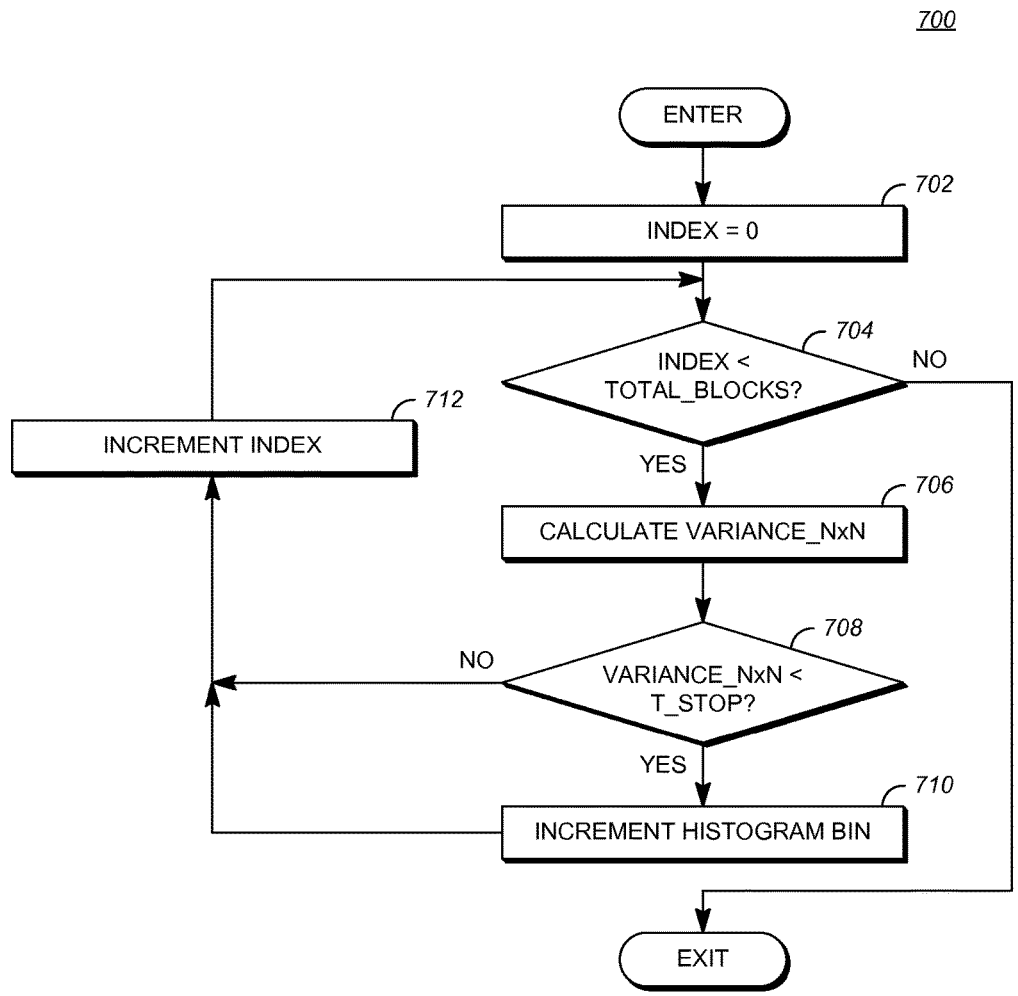
FIG. 7 is a flowchart diagram of a process for determining a variance histogram according to an aspect of the teachings herein.

At step 604, a histogram can be formed from variances determined for a difference frame using a technique shown in FIG. 7. FIG. 7 is a flowchart diagram of a process 700 for determining a variance histogram. The difference frame is partitioned into N×N-sized blocks where N can be 16 or 8 or any other size. At step 702, an index is set to 0 to keep track of the blocks within the difference frame, and the first block of the difference frame is selected for processing as the current block. When the index is equal to the total number of blocks in the difference frame TOTAL_BLOCKS, process 700 exits. In contrast, the current block is processed if the index is less than TOTAL_BLOCKS.

To process the current block, a variance value for the N×N block of the difference frame $S_d$ is calculated at step 706. The variance may be the standard deviation a or the actual variance $\sigma^2$. At step 708, the calculated value, variance_N×N, can be compared to a predetermined upper threshold T_stop. The upper threshold T_stop is set to reduce false positives by preventing some high variances from being put into the histogram. This prevents process 600 from determining too high a threshold for difference frames $S_d$ that may not contain any substantial static or slow-motion areas by eliminating some high variances from the histogram. In other words, T_stop allows a certain low value of variances. Setting T_stop is described in additional detail hereinafter. In this example T_stop has been set to 3000. If variance_N×N is greater than or equal to T_stop, process 700 increments the value of index at step 712 and loops back to step 704 to determine if more blocks remain to be processed and to process the next block as the current block. Blocks may be processed in any order, such as in raster scan order.

If variance_N×N calculated for the current block is less than T_stop at step 708, process 700 includes the variance in the variance histogram at step 710 by incrementing a bin of the histogram. For example, variance_N×N is divided by BIN_WIDTH, which is the width in variance units of a single bin of the variance histogram. The result is used to determine which bin of the histogram to increment. In this example, BIN_WIDTH is equal to 50. Following step 710, process 700 increments the value of index at step 712 and loops back to step 704 as described above. After all blocks are processed (index is equal to TOTAL_BLOCKS in step 704), process 700 ends, exiting to step 606 of FIG. 6, discussed below.

Figure 8A:
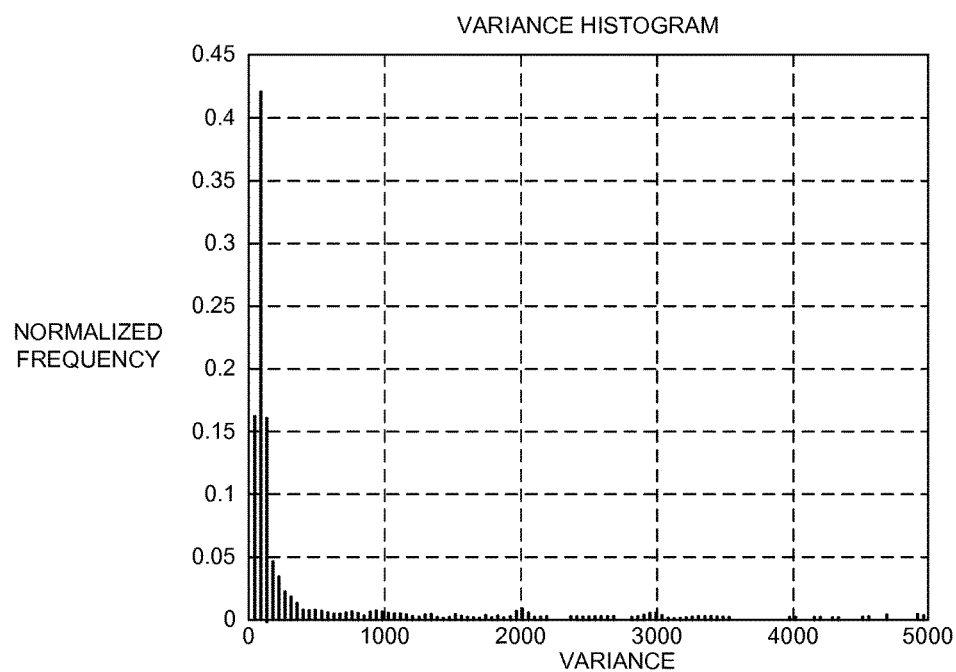
FIGS. 8A and 8B are variance histograms generated using a first video frame as a current frame in the process of FIG. 7.
Figure 8B:
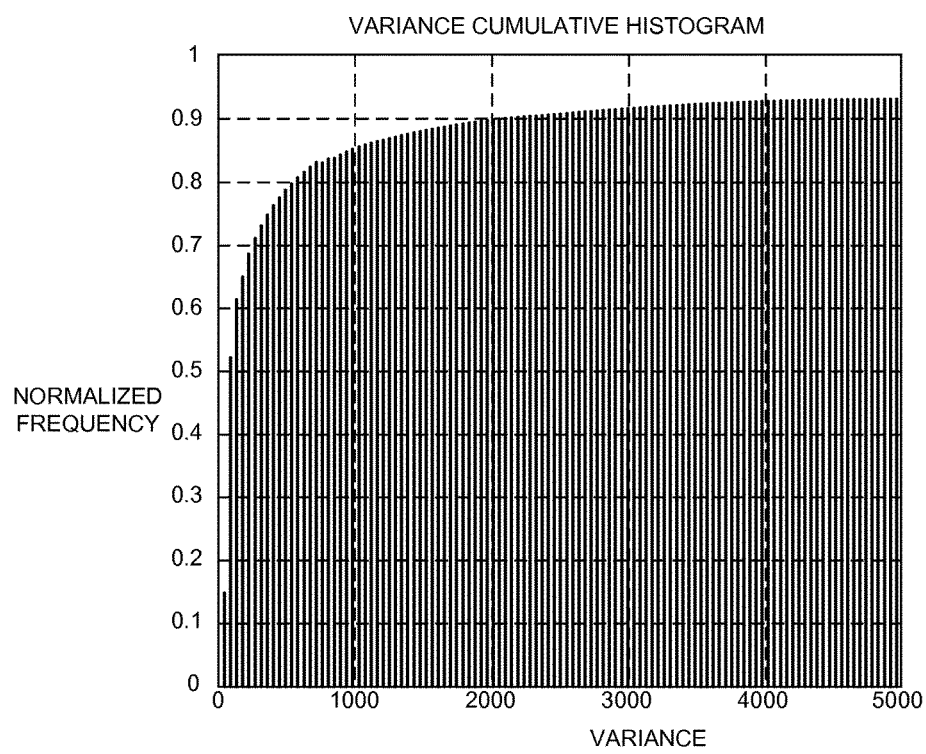
Figure 9A:
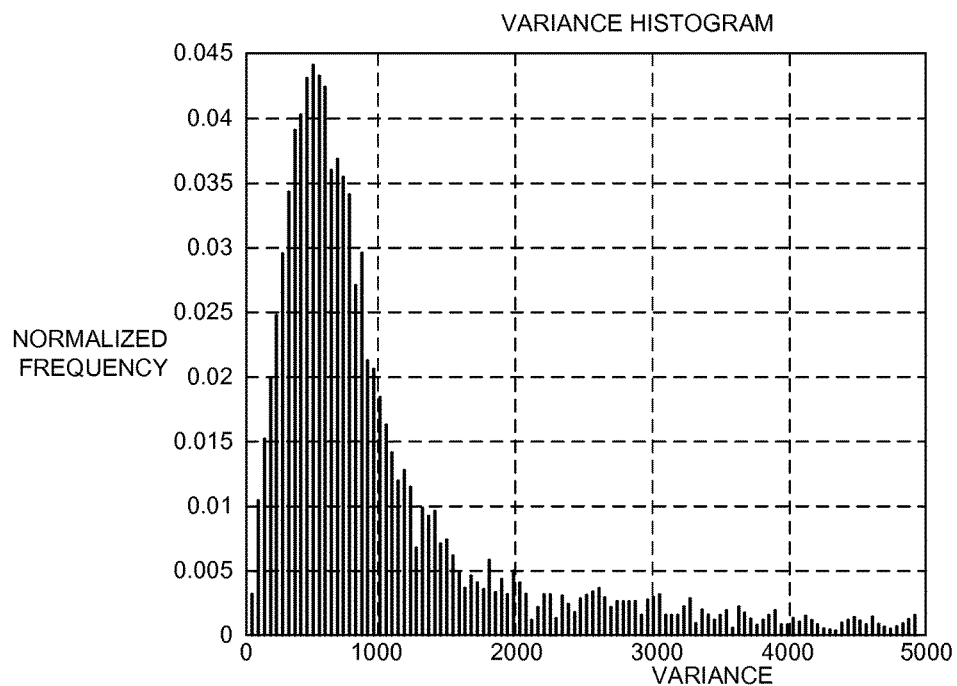
FIGS. 9A and 9B are variance histograms generated using a second video frame as a current frame in the process of FIG. 7.
Figure 9B:
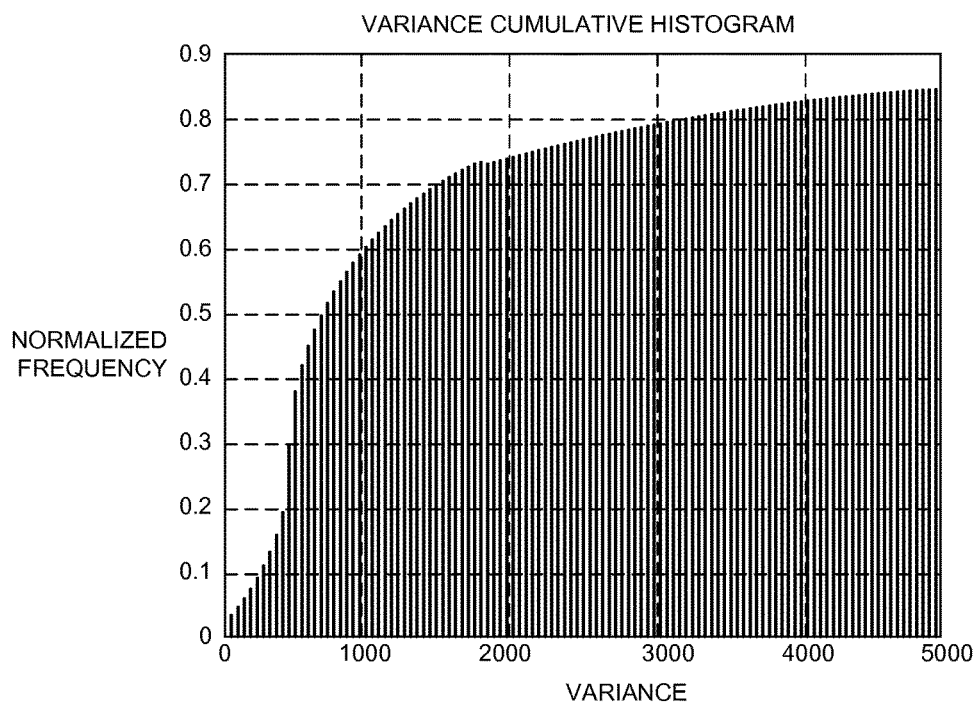
Figure 10A:
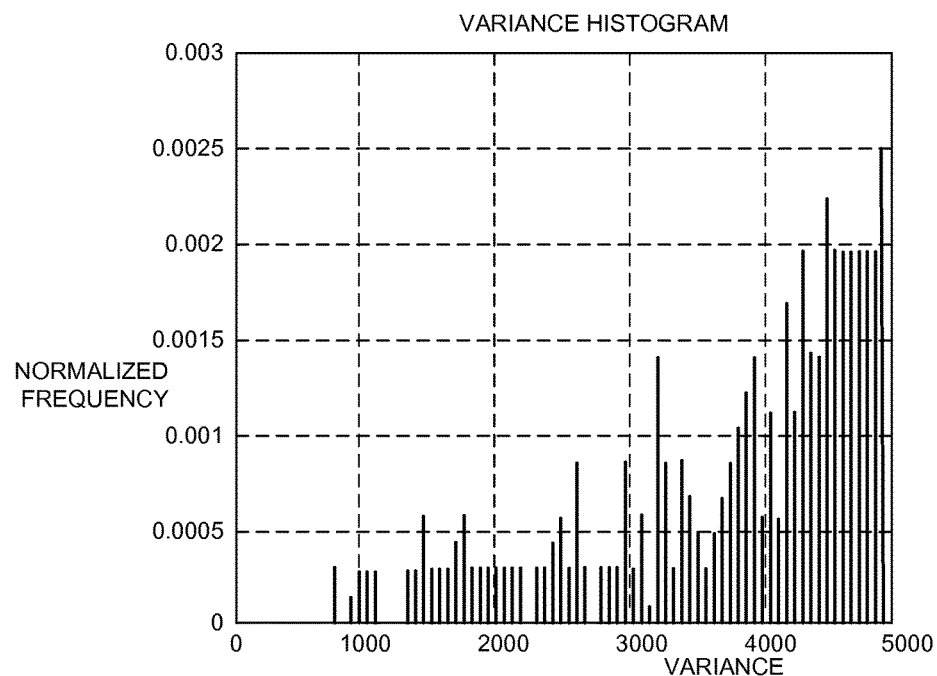
FIGS. 10A and 10B are variance histograms generated using a third video frame as a current frame in the process of FIG. 7.
Figure 10B:
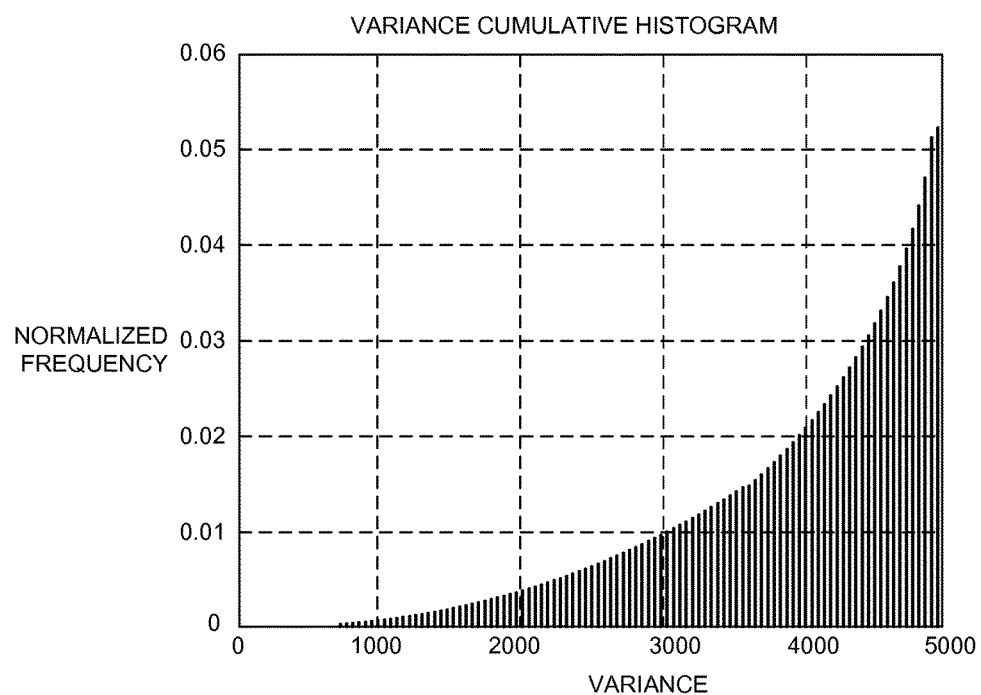

The output of process 700 is a frame-level variance distribution represented graphically by the variance histogram. FIGS. 8A and 8B are variance histograms generated using a first video frame as a current frame in process 700 of FIG. 7. FIGS. 9A and 9B are variance histograms generated using a second video frame as a current frame in process 700 of FIG. 7. FIGS. 10A and 10B are variance histograms generated using a third video frame as a current frame in process 700 of FIG. 7.

In the histograms of FIGS. 8A, 9A and 10A, variance is graphed on the X-axis and the frequency with which each value of the variable occurs is graphed on the Y-axis. The Y-axis is a normalized frequency that is proportional to the count of blocks whose variances fall in a respective bin. The first video frame has significant static or slow motion areas and low noise. The second video frame has significant static or slow motion areas but high noise. The third video frame has few static or slow motion areas. The majority of blocks in static or slow motion areas have relatively small variances. FIGS. 8A and 9A show these blocks as lying on the left side of the respective histograms. This characteristic allows us to statistically set a threshold using the variance histogram as described below to separate the static or slow motion areas from fast motion areas. Due to the relative lack of static or slow motion areas in the third video frame, most blocks demonstrate high variances. In such a case, no threshold may be set.

FIGS. 8B, 9B and 10B are variance cumulative histograms that graph the same data as FIGS. 8A, 9A and 10A, respectively, except that the Y-axis represents the cumulative number of blocks having a given variance or less for each value of variance on the X-axis. The variance cumulative histogram may also be used to statistically set the threshold as described below.

As mentioned above, after the histogram is formed by process 700, process 700 exits to step 606 of FIG. 6. At step 606, process 600 determines a threshold for the variance histogram. One way to determine a threshold T for the variance histogram is to calculate the mean µ and standard deviation σ of the variance distribution and set the value of T according to the formula:

$$T = \mu + (k * \sigma); \text{ where} \quad (1)$$

k is a multiplier. For example, k=1.

However, classifying slow-motion blocks into the fast-motion category is more tolerable than classifying fast-motion blocks into the slow-motion category in video compression. This is because the latter misclassification would more adversely affect video quality than the former. For this reason, a conservative threshold is preferred that limits false positives in the detection of slow motion areas.

One way to set a conservative threshold T is to use the cumulative histogram. A cutoff frequency C may be set either experimentally or theoretically. A corresponding threshold T is found on the X-axis for the cumulative histogram generated using the current frame. In this way, the number of blocks with a variance less than threshold T accounts for (100*C) % of the total blocks. This is demonstrated by FIGS. 11 and 12.

Figure 11:
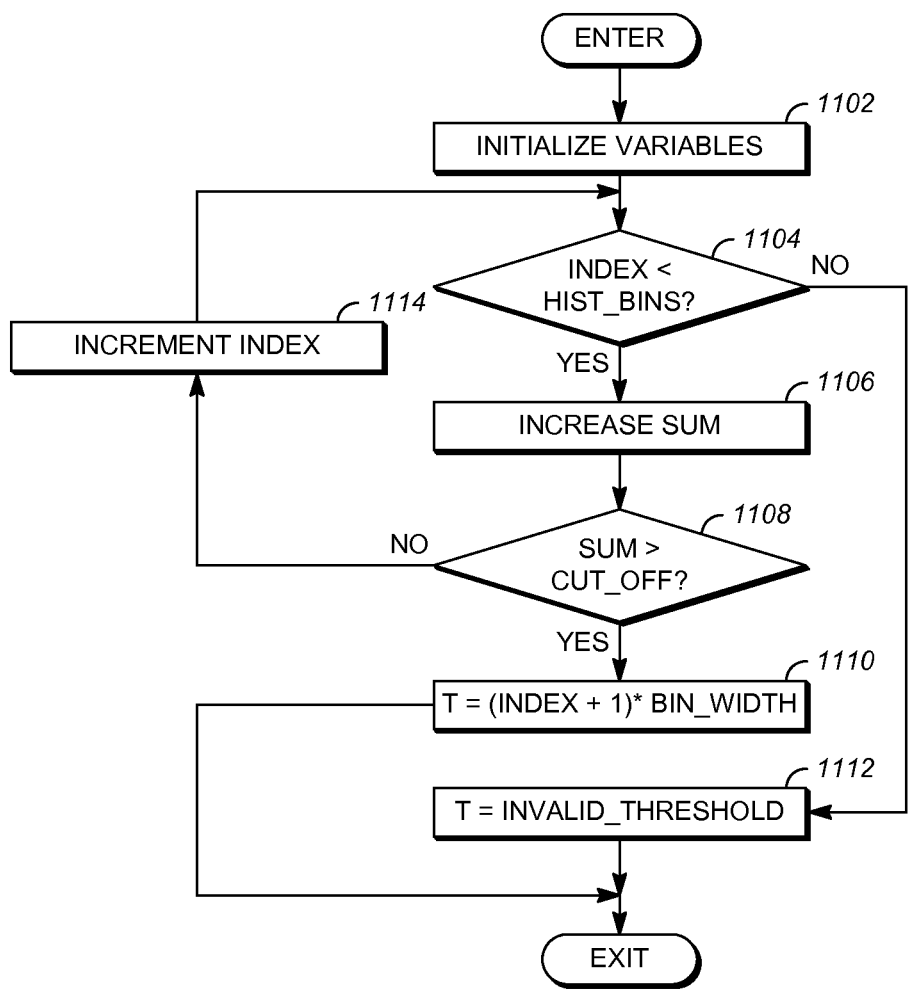
FIG. 11 is a flowchart diagram of a process for calculating a threshold according to an aspect of the teachings herein.

Referring first to FIG. 11, the flowchart diagram of FIG. 11 illustrates one process 1100 implementing this determination of the threshold T. Process 1100 can be implemented in a system such as computing device 200 as part of the encoding process for a video stream. Process 1100 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 1100. Process 1100 can also be implemented using hardware in whole or in part. As explained above, some computing devices may have multiple memories and multiple processors, and the steps of process 1100 may in such cases be distributed using different processors and memories.

For simplicity of explanation, process 1100 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 1102, variables index and sum are set to zero. The first bin is selected. At step 1104, the value of the variable index is compared to HIST_BINS, a variable that is set to the total number of histogram bins in the current variance histogram generated using the current frame. HIST_BINS is thus equal to T_stop/BIN_WIDTH. The determination of T_stop is discussed hereinafter. If index is less than HIST_BINS, the variable sum is incremented by the value of the variance histogram at the current bin index at step 1106. Broadly, the block count in each histogram is accumulated one by one. If the accumulated count is larger than a value CUT_OFF (which is equal to C*TOTAL_BLOCKS), the procedure stops and returns the threshold T. Otherwise, the accumulated count is low (less than or equal to CUT_OFF) such that process 1100 ends, meaning no threshold is set.

More specifically, the current value of sum is compared to a predetermined value CUT_OFF at step 1108. If the variable sum is greater than CUT_OFF, the threshold T is set at step 1110 according to the formula:

$$T = (\text{index} + 1) * \text{BIN\_WIDTH}. \tag{2}$$

If sum is less than or equal to CUT_OFF at step 1108, process 1100 increments index at step 1114 and loops back to step 1104 to see if all of the bins are processed and to get the next histogram bin for processing. If, at step 1104, process 1100 reaches the end of the bins such that index is equal to HIST_BINS, it is also true that step 1110 has not been executed. Therefore, threshold T has not been set to a valid value. At step 1112, threshold T is set to the value "INVALID_THRESHOLD," which means that no threshold is set for the current frame. Process 1100 exits and returns to step 608 of FIG. 6.

Figure 12:
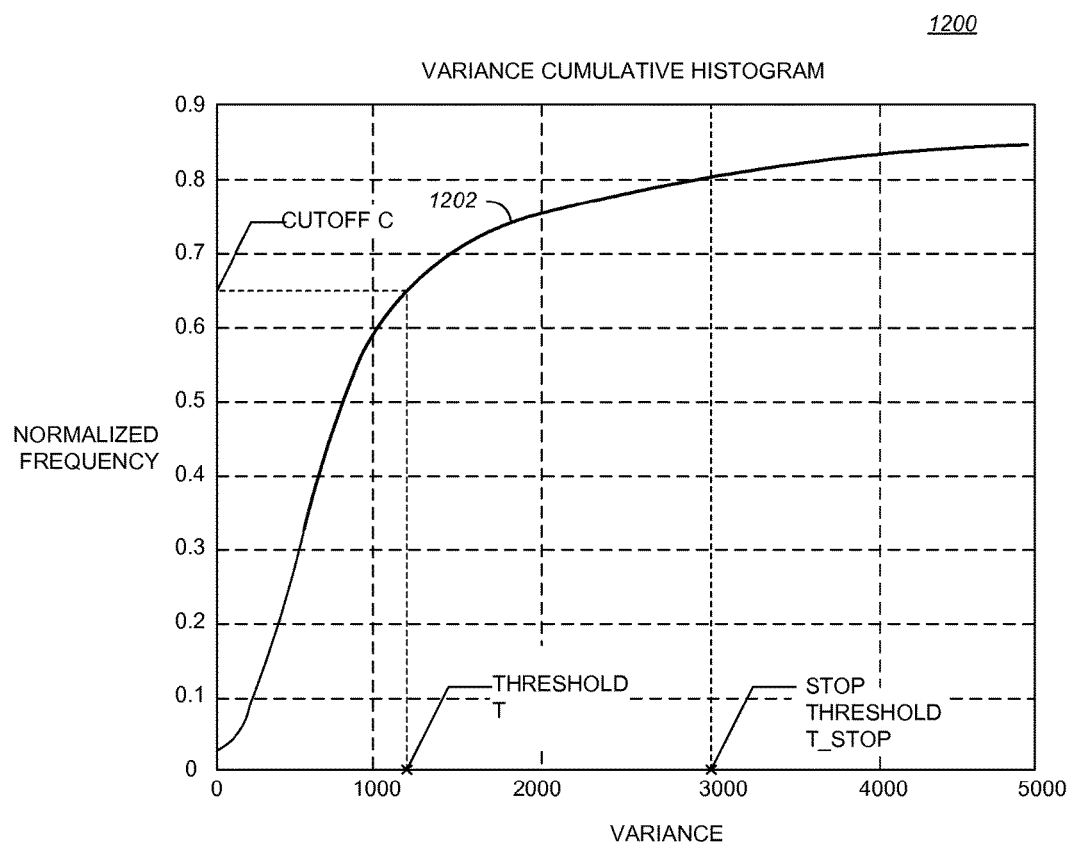
FIG. 12 is a cumulative variance histogram of showing thresholds according to an aspect of the teachings herein.

FIG. 12 is a cumulative variance histogram 1200 generated from a sample difference frame $S_d$. FIG. 12 shows the selection of the cutoff frequency C described above. The point along curve 1202 at which cutoff frequency C crosses curve 1202 defines the value of threshold T. FIG. 12 also shows the value of the stop threshold T_stop. T_stop allows the threshold finding process to stop if there is no slow-motion area such as in the case of the third video of FIGS. 10A and 10B. In the example shown, T_stop is equal to 3000. T_stop may be set experimentally or theoretically.

Referring again to FIG. 6, the current frame S is encoded at step 608 by passing it to an encoder along with the threshold T and the blocks of the difference frame $S_d$ along with their respective variances. When a threshold is set, the encoding process can consider whether each block of the current frame is within a static or slow-motion area or a fast motion area based on where its variance falls relative to the threshold T. When using this technique, the lack of a value for the threshold may also be used for the encoding process. That is, the lack of a threshold value may be used to indicate that all blocks within the current frame should be encoded as if they are located in fast motion areas.

As mentioned above, the encoder can use the threshold T and the variances to achieve greater efficiency in encoding the frame. For example, if the a block of the difference frame $S_d$ has a variance less than the threshold T, it means that the corresponding block from the current video frame S likely includes static or slow-motion portions of a scene. The subsequent encoding steps can be apprised of this information, thereby speeding up the encoding. For example, motion prediction may be skipped in its entirety for such blocks. Other techniques to speed up processing include using larger block partitioning for the areas of the current video frame S that include blocks having variances less than the threshold T, since they likely all include static or slow-motion portions of the scene. Other techniques that can be used include reducing the motion search range for motion prediction of some blocks and improving quantizer parameter setting in the rate/distortion loop.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method, comprising:
    forming a difference frame comprising differences between pixel values of a first video frame and a second video frame of a video stream;
    calculating, using a processor, a variance for blocks of the difference frame;
    forming a variance histogram using at least some of the calculated variances;
    determining a threshold variance value to separate static or low motion areas from fast motion areas wherein a portion of the blocks of the variance histogram representing static or low motion areas have variances less than or equal to the threshold variance value;
    selecting at least one encoding parameter for a block of the first video frame based on a comparison of a variance of a spatially-correspondent block in the difference frame with the threshold variance value; and
    encoding the block of the first video frame using the at least one encoding parameter.

2. The method of claim 1, further comprising:
    defining a stop threshold; and wherein
    forming the variance histogram comprises adding the calculated variance of a block of the difference frame to a bin of the variance histogram only when the calculated variance is below the stop threshold.

3. The method of claim 1 wherein determining the threshold variance value comprises calculating the threshold variance value T using a formula:

$T=\mu+k*\sigma$; wherein $\mu$ is a mean of the at least some of the calculated variances;
    $\sigma$ is a standard deviation of the at least some of the calculated variances; and
    k is a positive integer.

4. The method of claim 1 wherein the variance histogram is a cumulative variance histogram that plots the at least some of the calculated variances against a plurality of normalized frequency values; and wherein determining the threshold variance value comprises selecting a cutoff frequency value of the plurality of normalized frequency values, the threshold variance value corresponding to the cutoff frequency value on the cumulative variance histogram.

5. The method of claim 1 wherein determining the threshold variance value comprises:
    selecting a cutoff block count, wherein the cutoff block count is less than a total number of blocks forming the variance histogram;
    sequentially accumulating a block count of a plurality of histogram bins of the variance histogram from a lowest variance range to a highest variance range to form a sum, each of the plurality of histogram bins having a fixed bin width, until the sum is greater than the cutoff block count; and
    calculating the threshold variance value by multiplying the fixed bin width by a number of the plurality of histogram bins whose block count was included in the sum.

6. The method of claim 1, further comprising:
    forming a second difference frame comprising differences between pixel values of the second video frame and a third video frame of the video stream;
    calculating a variance for blocks of the second difference frame;
    forming a second variance histogram using at least some of the calculated variances of the second difference frame;
    selecting a cutoff block count, wherein the cutoff block count is less than a total number of blocks forming the second variance histogram;
    sequentially accumulating a block count of a plurality of histogram bins of the second variance histogram from a lowest variance range to a highest variance range to form a sum, each of the plurality of histogram bins having a fixed bin width, until one of the sum is greater than the cutoff block count or the block count of each of the plurality of histogram bins is included in the sum and the sum is less than or equal to the cutoff block count;
    calculating a second threshold variance value, when the sum is greater than the cutoff block count, by multiplying the fixed bin width by a number of the plurality of histogram bins whose block count was included in the sum;
    defining the second threshold variance value to a null value when the block count of each of the plurality of histogram bins is included in the sum and the sum is less than or equal to the cutoff block count; and
    when the second threshold variance value is other than the null value, selecting at least one encoding parameter for a block of the second video frame based on a comparison of a variance of a spatially-correspondent block in the second difference frame with the second threshold variance value.

7. The method of claim 6 wherein selecting the at least one encoding parameter comprises selecting a first setting for a first encoding parameter for the block when the variance of the spatially-correspondence block is less than the second threshold variance value and selecting a second setting for the first encoding parameter for the block when the variance of the spatially-correspondence block is greater than the second threshold variance value, the first setting increasing encoding efficiency as compared to the second setting for image data exhibiting static or slow motion.

8. The method of claim 7, further comprising:
    selecting the second setting for the first encoding parameter for the block when the second threshold variance value is the null value.

9. The method of claim 1 wherein the second video frame is temporally-adjacent to the first video frame in a sequence defined by the video stream and each block of the difference frame has a same size.

10. The method of claim 1 wherein selecting the at least one encoding parameter comprises at least one of:
    selecting a first motion search parameter when the variance of the spatially-correspondent block is less than the threshold variance value and selecting a second motion search parameter when the variance of the spatially-correspondent block is greater than the threshold variance value; or selecting a first quantization value when the variance of the spatially-correspondent block is less than the threshold variance value and selecting a second quantization value when the variance of the spatially-correspondent block is greater than the threshold variance value.

11. The method of claim 1 wherein selecting the at least one encoding parameter comprises:
providing a first group of partition sizes for prediction of the block of the first video frame when the variance of the spatially-correspondent block is less than the threshold variance value; and
providing a second group of partition sizes for prediction of the block of the first video frame when the variance of the spatially-correspondent block is greater than the threshold variance value, wherein at least one partition size of the second group of partition sizes is smaller than all partition sizes within the first group of partition sizes.

12. An apparatus, comprising:
a memory; and
a processor configured to execute instructions stored in the memory to:
form a difference frame comprising differences in pixel values between a first video frame and a second video frame of a video stream;
calculate a variance for blocks of the difference frame;
form a variance histogram using at least some of the calculated variances;
determine a threshold variance value to separate static or low motion areas from fast motion areas wherein a portion of the blocks of the variance histogram representing static or low motion areas have variances less than or equal to the threshold variance value;
select at least one encoding parameter for a block of the first video frame based on a comparison of a variance of a spatially-correspondent block in the difference frame with the threshold variance value; and
encode the block of the first video frame using the at least one encoding parameter.

13. The apparatus of claim 12 wherein the processor is configured to:
define a stop threshold; and
form the variance histogram by adding the calculated variance of a block of the difference frame to a bin of the variance histogram only when the calculated variance is below the stop threshold.

14. The apparatus of claim 12 wherein the processor is configured to determine the threshold variance value by:
calculating the threshold variance value T using a formula:

$$T = \mu + k*\sigma;\ \text{wherein}$$

$\mu$ is a mean of the at least some of the calculated variances;
$\sigma$ is a standard deviation of the at least some of the calculated variances; and
k is a positive integer.

15. The apparatus of claim 12 wherein the variance histogram is a cumulative variance histogram that plots the at least some of the calculated variances against a plurality of normalized frequency values; and wherein the processor is configured to determine the threshold variance value by:
selecting a cutoff frequency value of the plurality of normalized frequency values, the threshold variance value corresponding to the cutoff frequency value on the cumulative variance histogram.

16. The apparatus of claim 12 wherein the processor is configured to determine the threshold variance value by:
selecting a cutoff block count, wherein the cutoff block count is less than a total number of blocks whose variances form the variance histogram;
sequentially accumulating a block count of a plurality of histogram bins of the variance histogram from a lowest variance range to a highest variance range to form a sum, each of the plurality of histogram bins having a fixed bin width, until the sum is greater than the cutoff block count; and
calculating the threshold variance value by multiplying the fixed bin width by a number of the plurality of histogram bins whose block count was included in the sum.

17. The apparatus of claim 16 wherein the variance histogram is a cumulative variance histogram that plots the at least some of the calculated variances against a plurality of normalized frequency values; and wherein the processor is configured to select the cutoff block count by:
selecting a cutoff frequency value of the plurality of normalized frequency values; and
multiplying the cutoff frequency value by the total number of blocks.

18. The apparatus of claim 12 wherein the processor is configured to select the at least one encoding parameter by:
selecting a first setting for a first encoding parameter for the block of the first video frame when the variance of the spatially-correspondence block is less than the threshold variance value; and
selecting a second setting for the first encoding parameter for the block of the first video frame when the variance of the spatially-correspondence block is greater than the threshold variance value, the first setting increasing encoding efficiency as compared to the second setting for image data exhibiting static or slow motion.

19. The apparatus of claim 12 wherein the processor is configured to calculate the variance for blocks of the difference frame by, for each block:
forming distributions of pixel values of the block, each distribution having a mean and a standard deviation; and
combining the distributions to calculate the variance for the block.

20. The apparatus of claim 12 wherein the processor is configured to:
form a second difference frame comprising differences in pixel values between the second video frame and a third video frame of a video stream;
calculate a variance for blocks of the second difference frame;
form a second variance histogram using at least some of the calculated variances of the second difference frame;
select a cutoff block count, wherein the cutoff block count is less than a total number of blocks forming the second variance histogram;
sequentially accumulate a block count of a plurality of histogram bins of the second variance histogram from a lowest variance range to a highest variance range to form a sum, each of the plurality of histogram bins having a fixed bin width, until one of the sum is greater than the cutoff block count or the block count of each of the plurality of histogram bins is included in the sum and the sum is less than or equal to the cutoff block count;

calculate a second threshold variance value, when the sum is greater than the cutoff block count, by multiplying the fixed bin width by a number of the plurality of histogram bins whose block count was included in the sum;

define the second threshold variance value to a null value when the block count of each of the plurality of histogram bins is included in the sum and the sum is less than or equal to the cutoff block count; and when the second threshold variance value is other than the null value, select at least one encoding parameter for a block of the second video frame based on a comparison of a variance of a spatially-correspondent block in the second difference frame with the second threshold variance value.

* * * * *